US009025927B2

(12) United States Patent
Yeh et al.

(10) Patent No.: US 9,025,927 B2
(45) Date of Patent: May 5, 2015

(54) SYSTEMS AND METHODS OF VARIABLE FRAME RATE PLAYBACK

(75) Inventors: Shih-Hsien Yeh, Sinjhuang (TW); Kuan Sheng Fu, Taoyuan (TW); Chun Yueh Ou, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 512 days.

(21) Appl. No.: 12/410,515

(22) Filed: Mar. 25, 2009

(65) Prior Publication Data
US 2010/0247064 A1   Sep. 30, 2010

(51) Int. Cl.
| H04N 5/783 | (2006.01) |
| G06F 17/30 | (2006.01) |
| G11B 27/10 | (2006.01) |
| G11B 27/34 | (2006.01) |
| H04N 5/85 | (2006.01) |

(52) U.S. Cl.
CPC .......... *H04N 5/783* (2013.01); *G06F 17/30849* (2013.01); *G11B 27/105* (2013.01); *G11B 27/34* (2013.01); *H04N 5/85* (2013.01)

(58) Field of Classification Search
CPC ... H04N 5/783; G06F 17/30849; G11B 27/34
USPC .............................. 386/95, 278–280, 343–344
See application file for complete search history.

(56) References Cited

U.S. PATENT DOCUMENTS

| 6,081,264 | A * | 6/2000 | Rosen et al. .................. 715/723 |
| 7,082,398 | B1 | 7/2006 | Apple et al. |
| 2005/0010638 | A1* | 1/2005 | Richardson et al. .......... 709/204 |
| 2005/0071736 | A1* | 3/2005 | Schneider et al. ............ 715/500 |
| 2005/0141885 | A1* | 6/2005 | Roman et al. ................. 386/125 |
| 2006/0088094 | A1* | 4/2006 | Cieplinski et al. ....... 375/240.01 |
| 2007/0065800 | A1 | 3/2007 | Yang et al. |
| 2007/0136486 | A1 | 6/2007 | Al Amri |
| 2008/0136896 | A1* | 6/2008 | Graham et al. ............. 348/14.08 |
| 2008/0253735 | A1* | 10/2008 | Kuspa et al. .................... 386/52 |
| 2009/0115901 | A1* | 5/2009 | Winter et al. ................. 348/565 |

OTHER PUBLICATIONS

"thumbnail," ComputerUser Dictionary, 2 pages.*
"seminal," Webster's Third New International Dictionary, 1993, 1 page.*

* cited by examiner

*Primary Examiner* — Chau Le
(74) *Attorney, Agent, or Firm* — McClure, Qualey & Rodack, LLP (57) ABSTRACT

Systems and methods for variable rate playback are provided. Disclosed systems and methods of variable frame rate playback may reduce processor loading for presentation of multiple videos in a wall of video thumbnails, for example. The frame rate of the thumbnails may be dynamically changed based on different parameters. In an example embodiment, the parameter may include a video thumbnail position on a browsing page or the position of the video thumbnail as displayed on a video display. As an example embodiment of a default parameter, a seminal thumbnail may be set to the center thumbnail of a browsing page. Then, the frame rate of non-seminal thumbnails may decrease gradually relative to the distance from the seminal thumbnail. The frame rate may be dynamically changed based on a user behavior. The processor may enable real time decoding of the video thumbnail that a user focuses on, which may be determined, for example, by the position of a pointer, a selection of a thumbnail, and/or an entry of a particular video parameter as entered through a user interface.

34 Claims, 11 Drawing Sheets

SYSTEMS AND METHODS OF VARIABLE FRAME RATE PLAYBACK

TECHNICAL FIELD

The present disclosure is generally related to electronics and, more particularly, is related to electronic video displays.

BACKGROUND

A display device is an output device for presentation of information for visual reception, acquired, stored, or transmitted in various forms. When the input information is supplied as an electrical signal, the display is called an electronic display. Electronic displays are available for presentation of visual information. Common applications for electronic visual displays are television sets or computer monitors. An electronic display may be employed to show video thumbnails in a web browser. When viewing a web page, for instance, with a large number of video thumbnails, it may be difficult for a user to find the video clip that she is interested in. One way to enable viewing of the video of interest is to play full size video clips. However the loading on the processor would be high.

SUMMARY

Example embodiments of the present disclosure provide systems of variable rate playback. Briefly described, in architecture, one example embodiment of the apparatus, among others, can be implemented as follows: memory for storing software; and a processor for executing the software, the software comprising instructions configured to: display an array of video thumbnails; designate at least one thumbnail of the array of thumbnails as a seminal video thumbnail; set a seminal video thumbnail frame rate at a first rate; designate at least one video of the array of video thumbnails as a non-seminal video thumbnail; and set a frame rate of the at least one non-seminal video thumbnails at a second rate, the second rate lower than the first rate.

Embodiments of the present disclosure can also be viewed as providing methods of variable rate playback. In this regard, one embodiment of such a method, among others, can be broadly summarized by the following: displaying an array of video thumbnails; designating at least one thumbnail of the array of thumbnails as a seminal video thumbnail; setting a seminal video thumbnail frame rate at a first rate; designating at least one video of the array of video thumbnails as a non-seminal video thumbnail; and setting a frame rate of the at least one non-seminal video thumbnails at a second rate, the second rate lower than the first rate.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
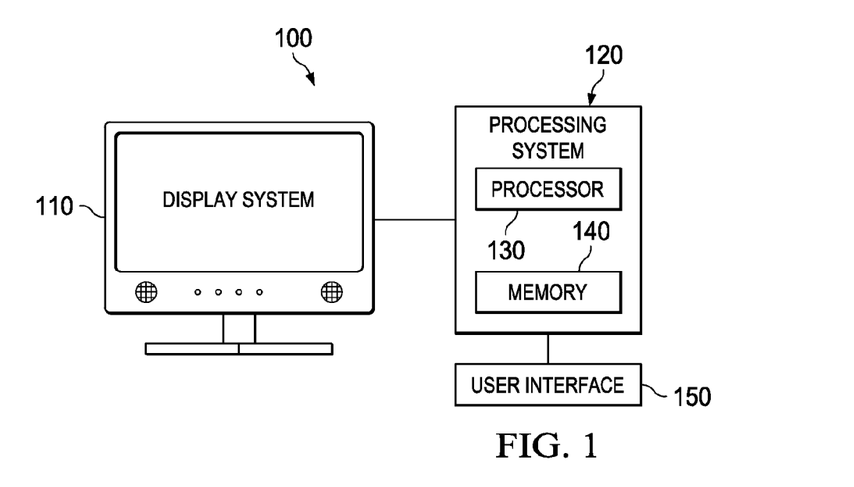
FIG. 1 is a diagram of an example embodiment of a system for variable rate playback.

Reference is now made to FIG. 1, which is a block diagram of an example embodiment of a system of variable rate playback 100. In accordance with certain embodiments, the steps for methods of variable rate playback described in this disclosure may be incorporated in software within a system 100. One of ordinary skill in the art will appreciate that such a system may comprise other components, which have been omitted for purposes of brevity. Generally, the system 100 may include processing system 120 which may comprise processor 130, and memory component 140 (which may include volatile and/or nonvolatile memory components).

System 100 may include a local interface, which may have additional elements, which are omitted for simplicity, such as controllers, buffers (caches), drivers, repeaters, and receivers to enable communications. Further, the local interface may include address, control, and/or data connections to enable appropriate communications among the aforementioned components. Processor 130 may be a device for executing software, particularly software stored in memory 140. Processor 130 can be any custom made or commercially available processor, a central processing unit (CPU), an auxiliary processor among several processors associated with system 100, a semiconductor based microprocessor (in the form of a microchip or chip set), a macroprocessor, or generally any device for executing software instructions.

Memory 140 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, memory 140 may incorporate electronic, magnetic, optical, and/or other types of storage media. One should note that some embodiments of memory 140 can have a distributed architecture (where various components are situated remotely from one another), but can be accessed by processor 130.

The software in memory 140 may include one or more separate programs, each of which includes an ordered listing of executable instructions for implementing logical functions. In the example shown in FIG. 1, the software in memory 140 may include an operating system. Furthermore, the software residing in memory 140 may include application specific software. The operating system may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within memory 140, so as to operate properly in connection with the operating system. When system 100 is in operation, processor 130 may be configured to execute software stored within memory 140, communicate data to and from memory 140, and generally control operations of system 100 pursuant to the software. Software in memory 140 may be read by the processor 130, buffered within processor 130, and then executed. Additionally, the operating system may be configured to control the execution of other computer programs and may be configured to provide scheduling, input-output control, file and data management, memory management, and communication control and related services.

User interface 150 may be coupled to system 100, and may include input devices, for example but not limited to, a keyboard, mouse, scanner, microphone, camera, proximity device, receiver, etc. User interface 150 may further include devices that communicate both as inputs and outputs, for instance but not limited to, a modulator/demodulator (modem for accessing another device, system, or network), a radio frequency (RF) or other transceiver, a telephonic interface, a bridge, a router, WIFI communications device, WiMAX communications device, Bluetooth communications device, etc.

The software in memory 140 may further include a basic input output system (BIOS) (omitted for simplicity). The BIOS is a set of software routines that initialize and test hardware at startup, start the operating system, and support the transfer of data among the hardware devices. The BIOS is stored in ROM so that the BIOS can be executed when system 100 is activated.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured media.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured media.

Visual display system 110, often called simply a monitor or display, is a piece of electrical equipment which displays images generated from the video output of processing system 120, without producing a permanent record. Most newer monitors typically consist of a TFT LCD, with older monitors based around a cathode ray tube (CRT). Display system 110 may comprise the display device, simple circuitry to generate and format a picture from video sent by the signals source, and usually an enclosure. Within the signal source, either as an integral section or a modular component, there may be a display adapter to generate video in a format compatible with the monitor.

An example embodiment of arranging multiple video feeds on one or more displays for viewing includes presentation of video thumbnails of the video feeds on visual display system 110. A video thumbnail may be a small version of the full-size video presentation. However, in some embodiments, the video thumbnail may be the same size as the full-size video presentation, or any size. The frame rates of the video thumbnails may be dynamically changed, among other reasons, to reduce processor loading, while still providing an indication of the content of the full-size video presentation.

An example embodiment of systems and methods of variable frame rate playback may reduce processor loading for presentation of multiple videos in a wall of video thumbnails, for example. The frame rate of the thumbnails may be dynamically changed based on different parameters. In an example embodiment, a parameter may include a video thumbnail position on a browsing page or the position of the video thumbnail as displayed on a video display. As an example embodiment of a default parameter, at least one seminal thumbnail may be set to the center thumbnail of browsing page. Then, the frame rate of non-seminal thumbnails may decrease gradually relative to the distance from the seminal thumbnail.

In another example embodiment, the frame rate may be dynamically changed based on a user behavior. In this embodiment, the processor may enable real time decoding of the video thumbnail that a user focuses on, which may be determined, for example, by the position of a pointer, a selection of a thumbnail, and/or an entry of a particular video parameter as entered through user interface 150, among others.

Figure 2A:
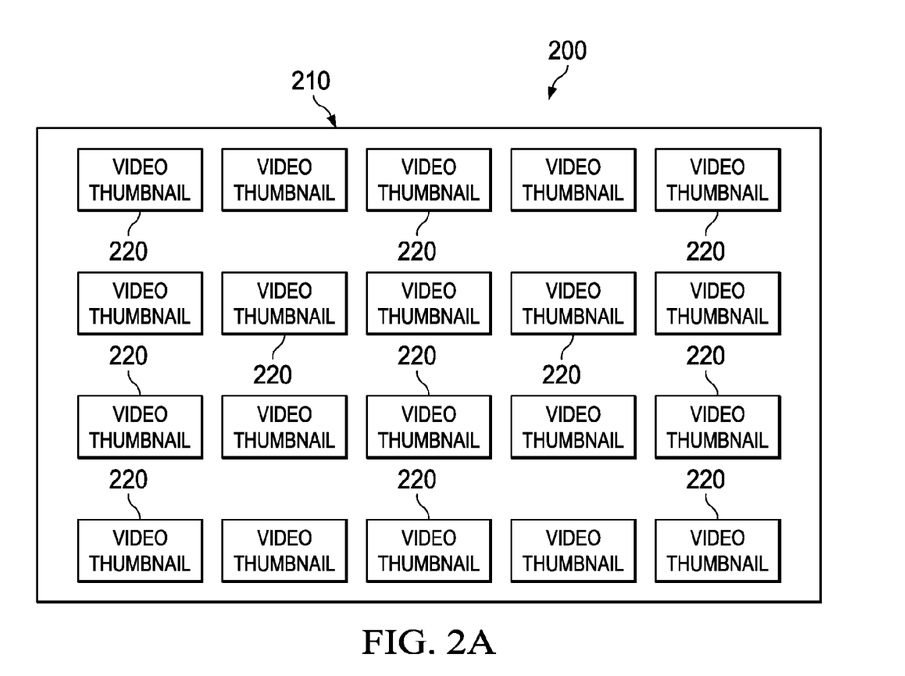
FIG. 2A is a diagram of an example embodiment of a rectangular display array used in the system of FIG. 1.
Figure 2B:
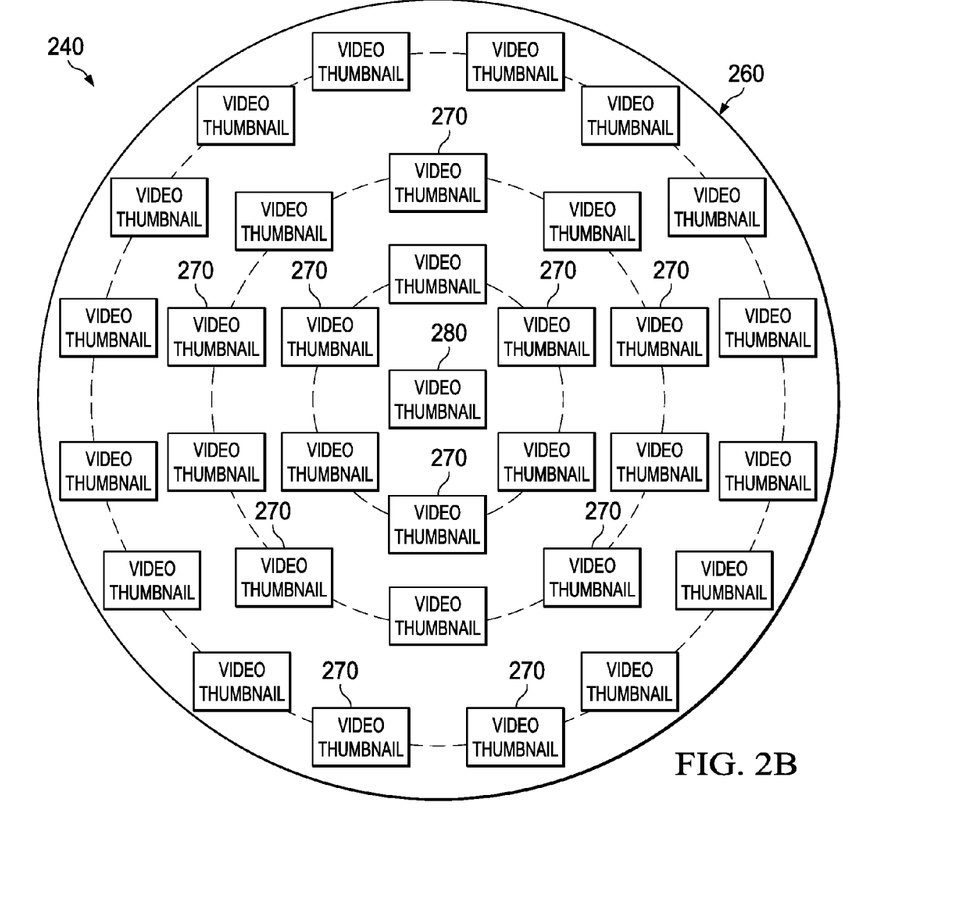
FIG. 2B is a diagram of an example embodiment of a circular display array used in the system of FIG. 1.

FIGS. 2A and 2B provide example embodiments of a video wall. Video display 200 of FIG. 2A comprises rectangular array 210 of video thumbnails 220 with video thumbnails 220 arranged in rows and columns. Video display 240 of FIG. 2B comprises circular array 260 of video thumbnails 270, 280. In the example embodiment provided in FIG. 2B, video thumbnail 280 is at the center of video array 240. The number of thumbnails in arrays 200, 260 are not limited by the number shown in FIGS. 2A and 2B. Video arrays 200 and 260 may contain any number of video thumbnails. Also, the video thumbnails of FIGS. 2A and 2B are shown in regular rectangle and circular arrays, but the video thumbnails may be presented in any regular or irregular array.

Figure 3:
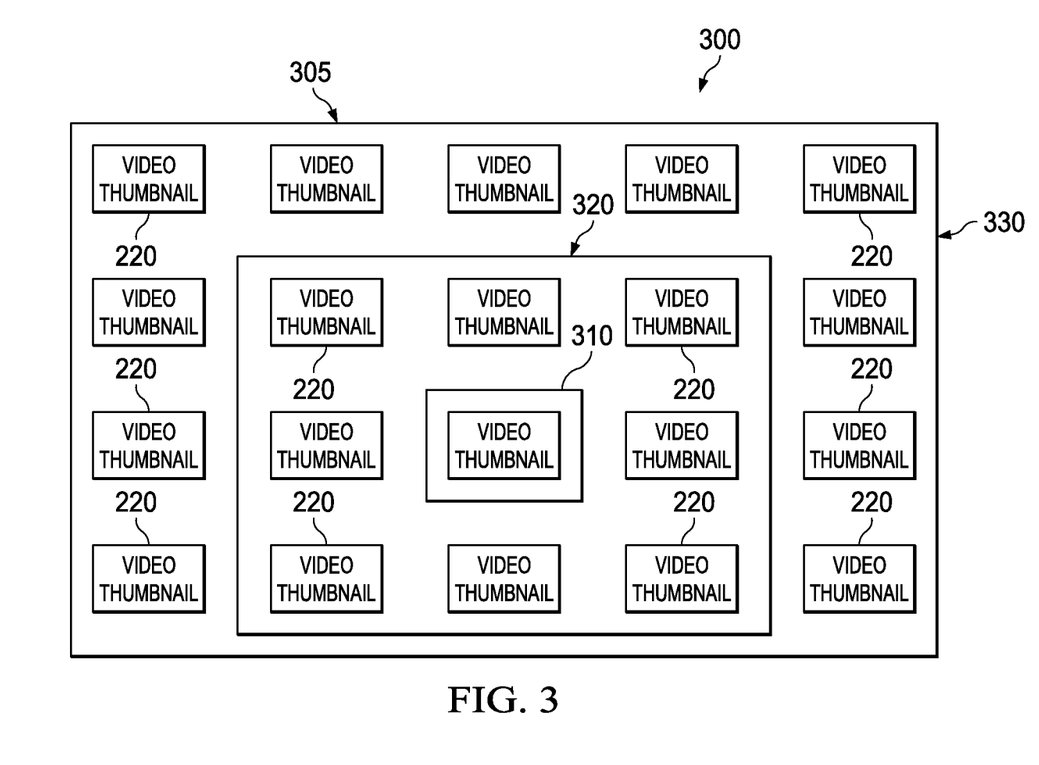
FIG. 3 is a diagram of an example embodiment of a system for varying frame rates of video thumbnails in the rectangular display array of FIG. 2A.

FIG. 3 provides an example embodiment of video display 300 comprising rectangular array 305 of video thumbnails 220. In this example embodiment, one of video thumbnails 220 is selected as seminal video thumbnail 310. A second set of thumbnails 320 is selected such that each thumbnail in set of thumbnails 320 (excluding seminal thumbnail 310) is in a surrounding set of thumbnails. In an X,Y array, with seminal thumbnail coordinates of $X_c, Y_c$, the second set of thumbnails 320 may have array coordinates $X_s, Y_s$, such that $\max(|X_s-X_c|, |Y_c-Y_s|)=1$, where $\max(x)$ is a maximum function. A third set of thumbnails 330 may also be selected to have coordinates $X_t, Y_t$, such that $\max(|X_s-X_c|, |Y_c-Y_s|)=2$. This designation may be repeated for all such thumbnails in array 305.

A first frame rate is then set for the seminal video thumbnail 310, a second frame rate for the second set of thumbnails 320, a third frame rate for the third set of thumbnails 330, and so on. In an example embodiment, the frame rate for seminal video thumbnail 310 is the highest frame rate, followed by a lower frame rate for second set of thumbnails 320 and a still lower frame rate for third set of thumbnails 330. The frame rate of seminal video thumbnail 310, second set of thumbnails 320, and third set of thumbnails 330 may each be set according to a user preference. Every, some, or none of the sets may be set accordingly.

In FIG. 3, seminal video thumbnail 310 is shown as being near the middle of video array 305. However, as provided in FIG. 4, seminal video thumbnail 410 may be selected as near an edge of array 405. The selection of the seminal video thumbnail 410 may be, as non-limiting examples, selected by location or by proximity to a location designated in a parameter set by a user. The parameter may alternatively be set by an administrator, generated by an algorithm, generated pseudo-randomly, or set by a user input. Non-limiting examples of user input may include selection using a pointer, and the location of the pointer without an active selection. The seminal video thumbnail may be set, for example, by moving a pointer to a location on the display. The parameter may be adjusted such that the seminal video thumbnail is set as the closest to the pointer, only the video thumbnail directly under the pointer, or the video thumbnail furthest from the pointer, as non-limiting examples.

Figure 4:
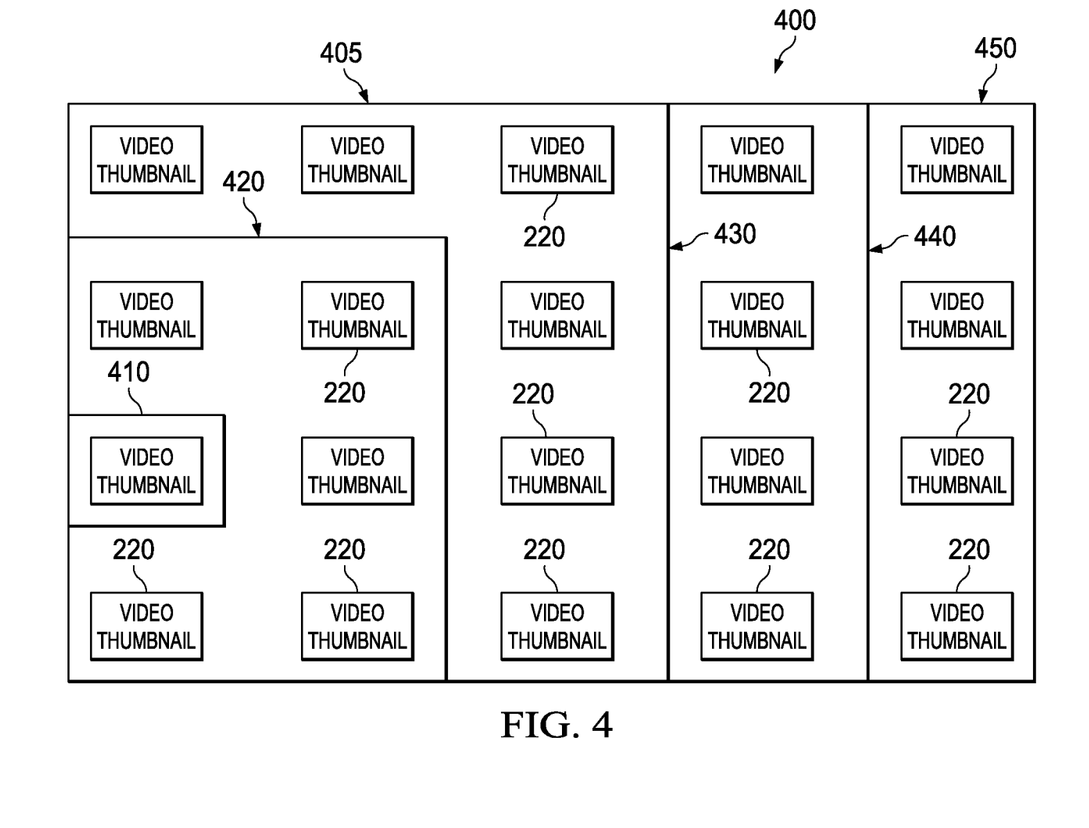
FIG. 4 is a diagram of an example embodiment of a system for varying frame rates of video thumbnails in the rectangular display array of FIG. 2A.

A second set of thumbnails 420 is selected such that each thumbnail in set of thumbnails 420 (excluding seminal thumbnail 410) is in a surrounding set of thumbnails. In an X,Y array, with seminal thumbnail coordinates of $X_c, Y_c$, the second set of thumbnails 420 may have array coordinates $X_s, Y_s$, such that $\max(|X_s-X_c|, |Y_c-Y_s|)=1$, where $\max(x)$ is a maximum function. A third set of thumbnails 430 may also be selected to have coordinates $X_t, Y_t$, such that $\max(|X_s-X_c|, |Y_c-Y_s|)=2$. This designation may be repeated for all such thumbnails in array 405.

A first frame rate is then set for the seminal video thumbnail 410, a second frame rate for the second set of thumbnails 420, a third frame rate for the third set of thumbnails 430, and so on. In an example embodiment, the frame rate for seminal video thumbnail 410 is the highest frame rate, followed by a lower frame rate for second set of thumbnails 420 and a still lower frame rate for third set of thumbnails 430.

Figure 5:
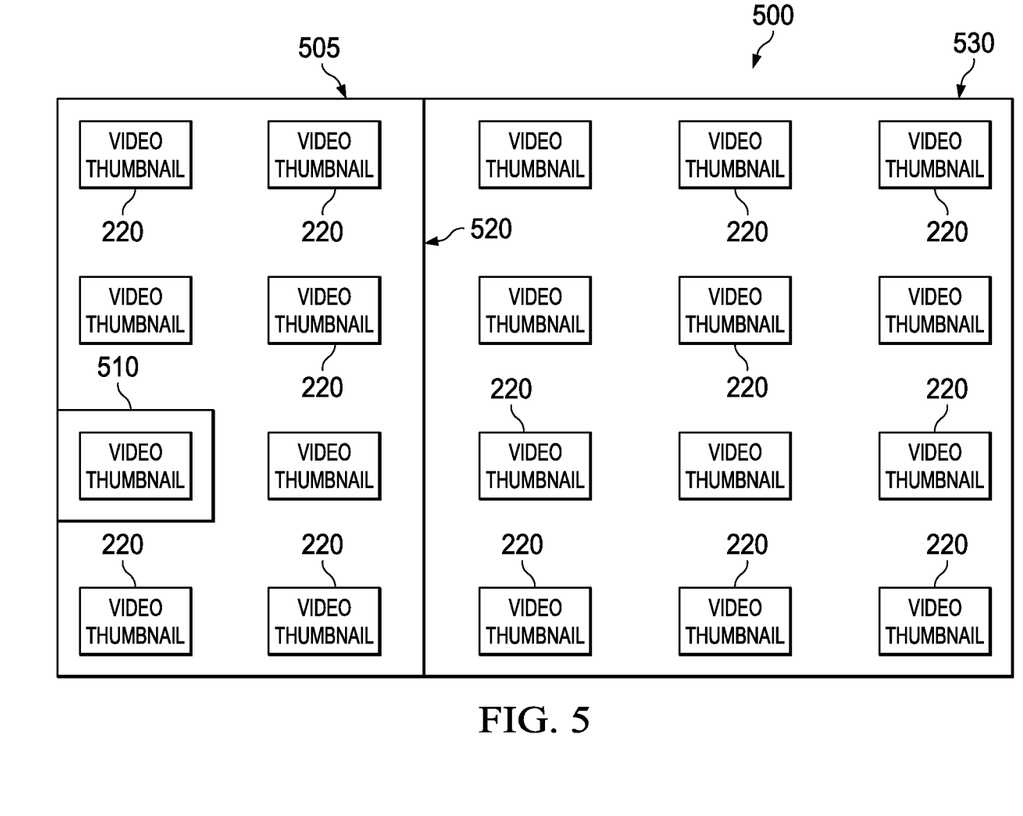
FIG. 5 is a diagram of an example embodiment of a system for varying frame rates of video thumbnails in the rectangular display array of FIG. 2A.

FIG. 5 provides another example embodiment of systems and methods of variable frame rate playback with display 500 displaying video thumbnail array 505 in which seminal video thumbnail 510 is not in the center of the display. In this example embodiment, seminal video thumbnail 510 is in the left-most column of rectangular array 505. The 2 left-most columns excluding seminal video thumbnail are selected as second set of video thumbnails 520. The next three columns of video thumbnails are selected as third set of video thumbnails 530. The number of columns selected for sets 520, 530 may be preset or may be linked to a user action, or input through user interface 150. The selection of thumbnails and frame rates should not be limited to those listed in this disclosure. There are many other ways that seminal video thumbnail 510 may be selected and there are many ways that second set 520, third set 530, etc, may be selected to arrange the thumbnails with various frame rates and should be considered as having been disclosed herein.

A first frame rate is then set for the seminal video thumbnail 510, a second frame rate for the second set of thumbnails 520, a third frame rate for the third set of thumbnails 530, and so on. In an example embodiment, the frame rate for seminal video thumbnail 510 is the highest frame rate, followed by a lower frame rate for second set of thumbnails 520 and a still lower frame rate for third set of thumbnails 530.

Figure 6:
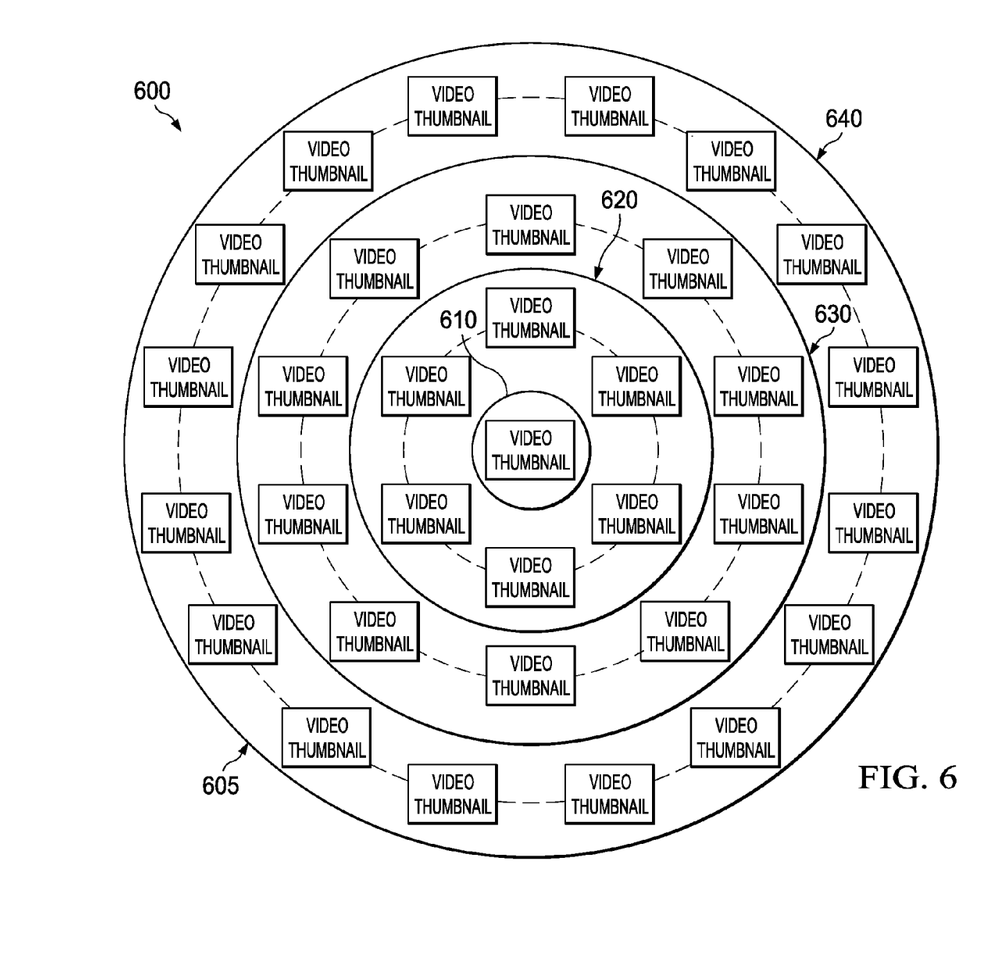
FIG. 6 is a diagram of an example embodiment of a system for varying frame rates of video thumbnails in the circular display array of FIG. 2B.

FIG. 6 provides another example embodiment of systems and methods of variable frame rate playback with display 600 displaying circular video thumbnail array 605 in which seminal video thumbnail 610 is in the center of the display. In this example embodiment, video thumbnails at a distance of 1 from seminal video thumbnail 610 are selected as second set of video thumbnails 620. Video thumbnails at a distance of 2 from seminal video thumbnail 610 are selected as third set of video thumbnails 630. Video thumbnails at a distance of 3 from seminal video thumbnail 610 are selected as fourth set of video thumbnails 640. The selection of thumbnails and frame rates should not be limited to those listed in this disclosure. There are many other ways that seminal video thumbnail 610 may be selected and there are many ways that second set 620, third set 630, etc, may be selected to arrange the thumbnails with various frame rates and should be considered as having been disclosed herein.

A first frame rate is then set for the seminal video thumbnail 610, a second frame rate for the second set of thumbnails 620, a third frame rate for the third set of thumbnails 630, and so on. In an example embodiment, the frame rate for seminal video thumbnail 610 is the highest frame rate, followed by a lower frame rate for second set of thumbnails 620 and a still lower frame rate for third set of thumbnails 630, and so on.

Figure 7:
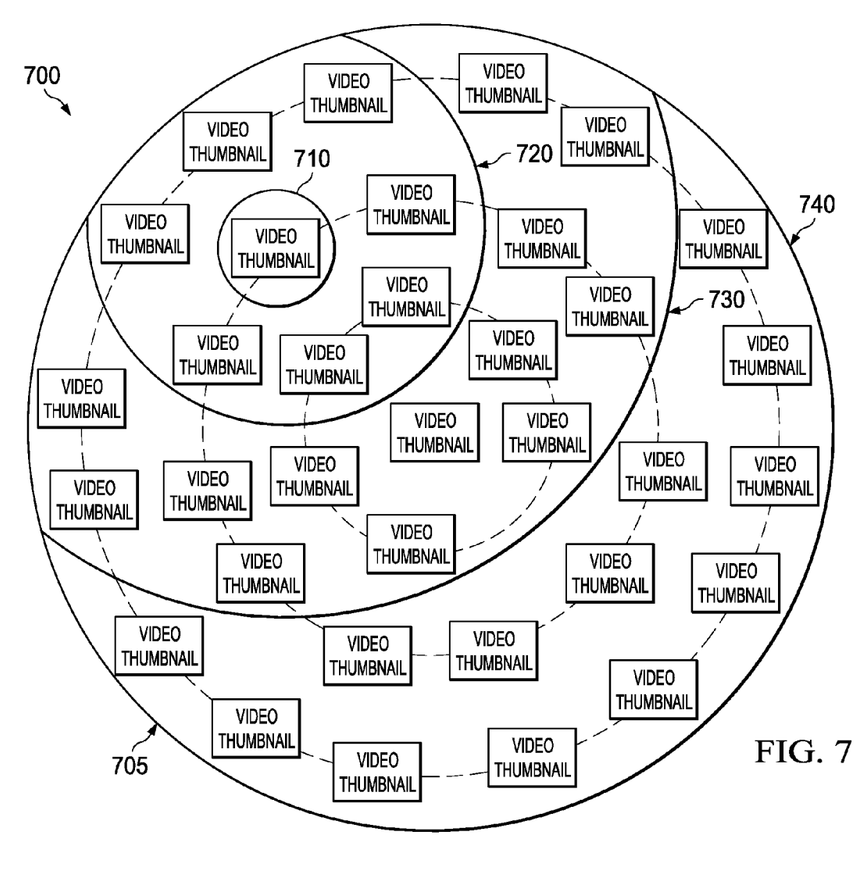
FIG. 7 is a diagram of an example embodiment of a system for varying frame rates of video thumbnails in the circular display array of FIG. 2B.

FIG. 7 provides another example embodiment of systems and methods of variable frame rate playback with display 700 displaying circular video thumbnail array 705 in which seminal video thumbnail 710 is not in the center of the display. In this example embodiment, seminal video thumbnail 710 is in an upper quadrant of circular array 705. A second group of video thumbnails excluding seminal video thumbnail 710 is selected as second set of video thumbnails 720. A third group of video thumbnails is selected as third set of video thumbnails 730. The number of video thumbnails selected for sets 720, 730 may be preset, may be linked to a user action, or input through user interface 150. The selection of thumbnails and frame rates should not be limited to those listed in this disclosure. There are many other ways that seminal video thumbnail 710 may be selected and there are many ways that second set 720, third set 730, etc, may be selected to arrange the thumbnails with various frame rates and should be considered as having been disclosed herein.

A first frame rate is then set for the seminal video thumbnail 710, a second frame rate for the second set of thumbnails 720, a third frame rate for the third set of thumbnails 730, and so on. In an example embodiment, the frame rate for seminal video thumbnail 710 is the highest frame rate, followed by a lower frame rate for second set of thumbnails 720 and a still lower frame rate for third set of thumbnails 730.

Figure 8:
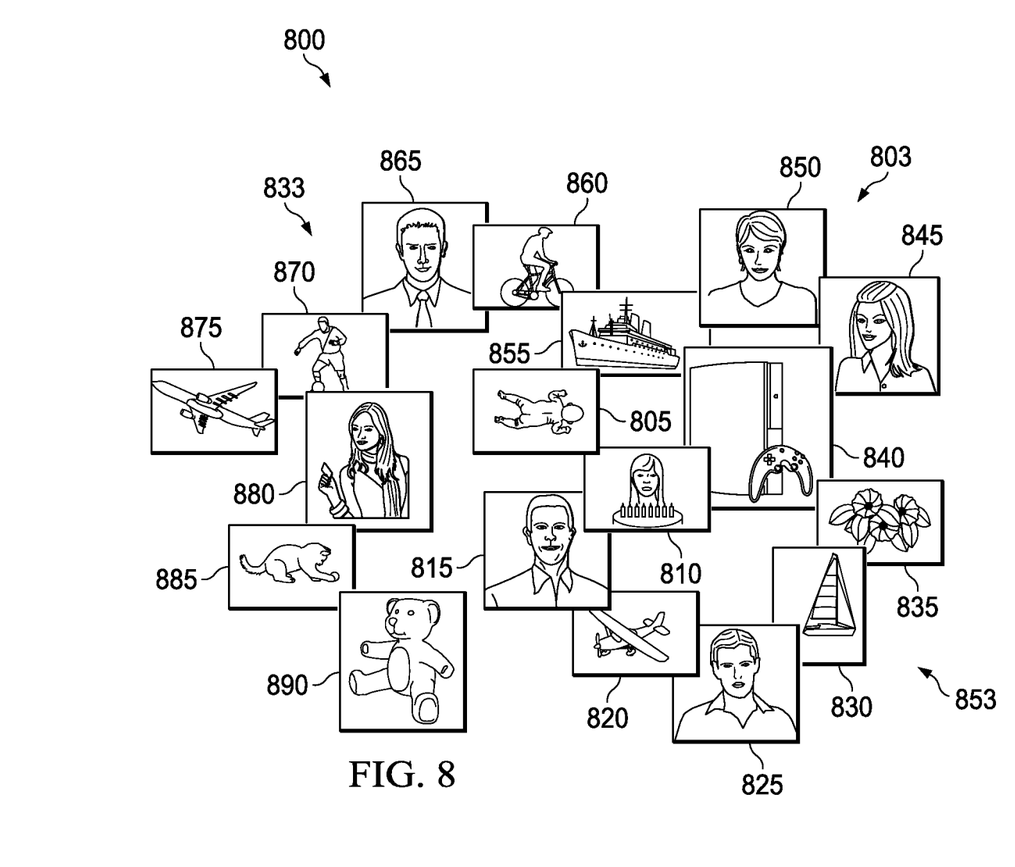
FIG. 8 is a diagram of an example embodiment of a system for varying frame rates of video thumbnails in the display of overlapping thumbnails.

FIG. 8 provides another example embodiment of systems and methods of variable frame rate playback with display 800 displaying scattered thumbnail array 803 with seminal video thumbnail 805. Seminal video thumbnail 805 may be selected as the centermost frame, the topmost frame, or any other frame that is not in the center of the display. In this example embodiment, seminal video thumbnail 805 is the topmost frame of scattered thumbnail array 803. A second group of video thumbnails excluding seminal video thumbnail 805 is selected as second set of video thumbnails 833. In this example embodiment, the second group of video thumbnails includes thumbnails 810, 815, 855, and 860 surrounding seminal video thumbnail 805. A third group of video thumbnails is selected as third set of video thumbnails 853. The number of video thumbnails selected for sets 833, 853 may be preset, may be linked to a user action, or input through user interface 150. In this example embodiment, set 833 includes thumbnails 865, 870, 875, and set 853 includes thumbnails 820, 825, 830, and 835. The selection of thumbnails and frame rates should not be limited to those listed in this disclosure. There are many other ways that seminal video thumbnail 805 may be selected and there are many ways that second set 833, third set 853, etc, may be selected to arrange the thumbnails with various frame rates and should be considered as having been disclosed herein.

A first frame rate is then set for the seminal video thumbnail 805, a second frame rate for the second set of thumbnails 833, a third frame rate for the third set of thumbnails 853, and so on. In an example embodiment, the frame rate for seminal video thumbnail 805 is the highest frame rate, followed by a lower frame rate for second set of thumbnails 833 and a still lower frame rate for third set of thumbnails 853. The video thumbnails of an example embodiment of FIG. 8 could be different sizes, and/or could be covered by other frames. In such an embodiment, the selection of seminal video thumbnail and the frame rate could be determined according to the visible area of the video frame which is calculated from the size and the un-overlapped region. In one example embodiment, the seminal video thumbnail is set as the video thumbnail with the largest visible area before any selection of the video thumbnail is obtained from the user interface. The seminal video thumbnail is set at a first rate. The average uncovered area of thumbnails in the second set of thumbnails is calculated to determine the ratio of uncovered area to area of the seminal video thumbnail. This ratio may be multiplied by the frame rate of the seminal video thumbnail to determine the frame rate of the second set of video thumbnails. In other words, the frame rate of the second set of video thumbnails would be substantially equal to the percentage of the at least one partially covered video thumbnail that is uncovered.

An alternative embodiment using scattered thumbnail array 803 involves the thumbnails appearing over time, either individually (one at a time) or in groups. For example, in FIG. 8, only video thumbnail 865 is visible at a start time. Video thumbnail 865 is the seminal video thumbnail. At a later time, video thumbnail 860 and 870 are displayed and may or may not overlap video thumbnail 865. In the case that video thumbnail 860 and 870 overlap video thumbnail 865, video thumbnails 860 and 870 become the seminal video thumbnails, and video thumbnail 865 is redesignated as a second set. Next, in this example, video thumbnails 875, 880, 885, and 850 appeared in sequence and overlap on the previously appearing thumbnails. The top video thumbnails become the seminal video thumbnails and the overlapped thumbnails are redesignated in lower sets. The location of the new thumbnail may be random, but the new thumbnail may be placed on the top, in an example embodiment. In other words, the new thumbnail is not covered by the previous one. The newest thumbnail, which may be the topmost thumbnail is the seminal video thumbnail and is assigned the highest frame rate.

Figure 9A:
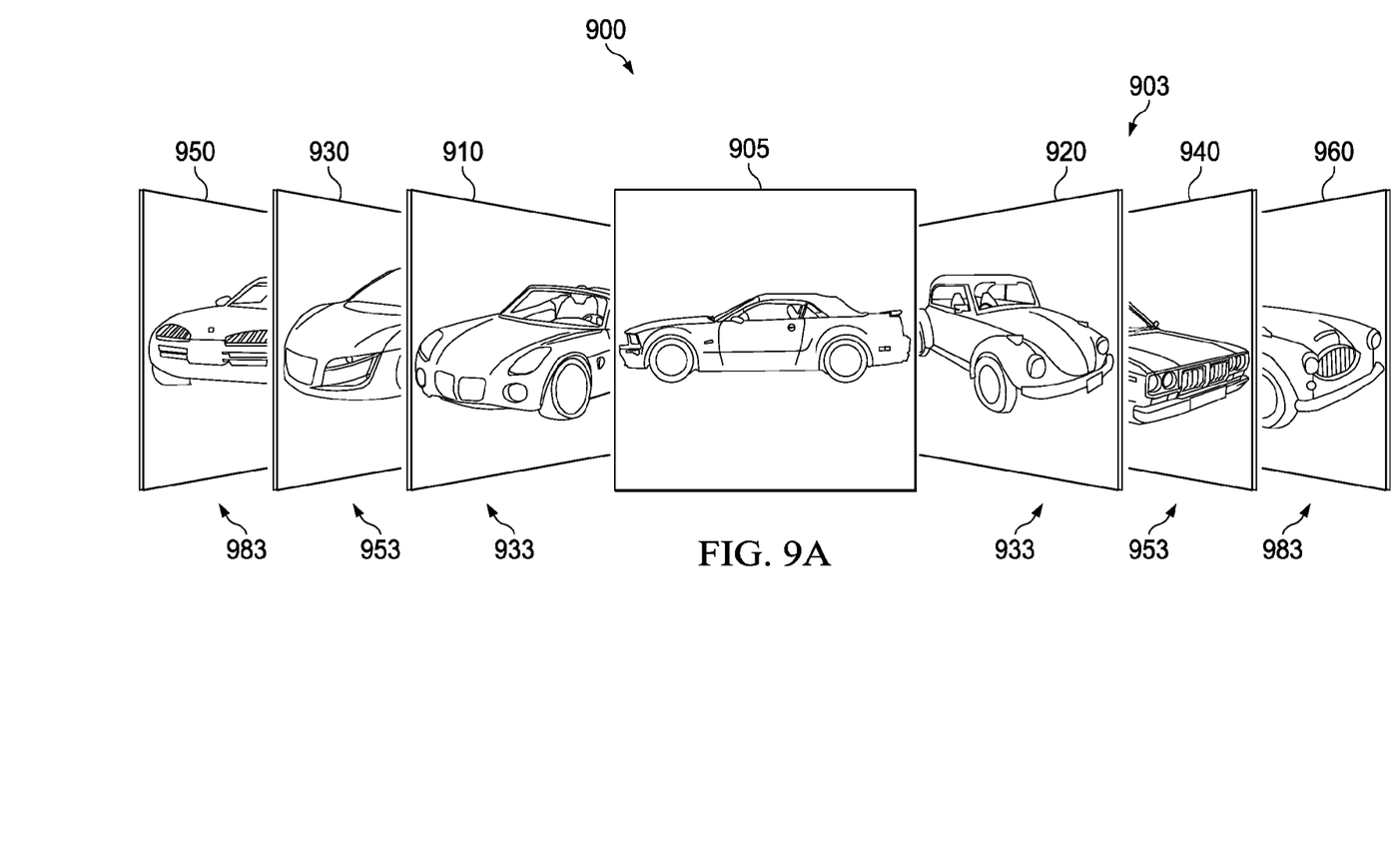
FIG. 9A is a diagram of an example embodiment of a system for varying frame rates of video thumbnails in a coverflow display.

FIG. 9A provides another example embodiment of systems and methods of variable frame rate playback with display 900 displaying thumbnail array 903 with seminal video thumbnail 905. Seminal video thumbnail 905 may be selected as the centermost frame or any other frame that is not in the center of the display. In this example embodiment, seminal video thumbnail 905 is the centermost frame of thumbnail array 903. A second group of video thumbnails excluding seminal video thumbnail 905 is selected as second set of video thumbnails 933. A third group of video thumbnails is selected as third set of video thumbnails 953. A fourth group of video thumbnails is selected as fourth set of video thumbnails 983. The number of video thumbnails selected for sets 933, 953, 983 may be preset, may be linked to a user action, or input through user interface 150. The selection of thumbnails and frame rates should not be limited to those listed in this disclosure. There are many other ways that seminal video thumbnail 805 may be selected and there are many ways that second set 933, third set 953, etc, may be selected to arrange the thumbnails with various frame rates and should be considered as having been disclosed herein.

A first frame rate is then set for the seminal video thumbnail 805, a second frame rate for the second set of thumbnails 933, a third frame rate for the third set of thumbnails 953, and so on. In an example embodiment, the frame rate for seminal video thumbnail 905 is the highest frame rate, followed by a lower frame rate for second set of thumbnails 933 and a still lower frame rate for third set of thumbnails 953, etc. The video thumbnails of an example embodiment of FIG. 9A could be different sizes, and/or could be covered by other frames. In such an embodiment, the frame rate could be determined according to the visible area of the video frame which is calculated from the size and the un-overlapped region. In one example embodiment, the seminal video thumbnail is set at a first rate. The average uncovered area of thumbnails in the second set of thumbnails is calculated to determine the ratio of uncovered area to area of the seminal video thumbnail. This ratio may be multiplied by the frame rate of the seminal video thumbnail to determine the frame rate of the second set of video thumbnails.

Figure 9B:
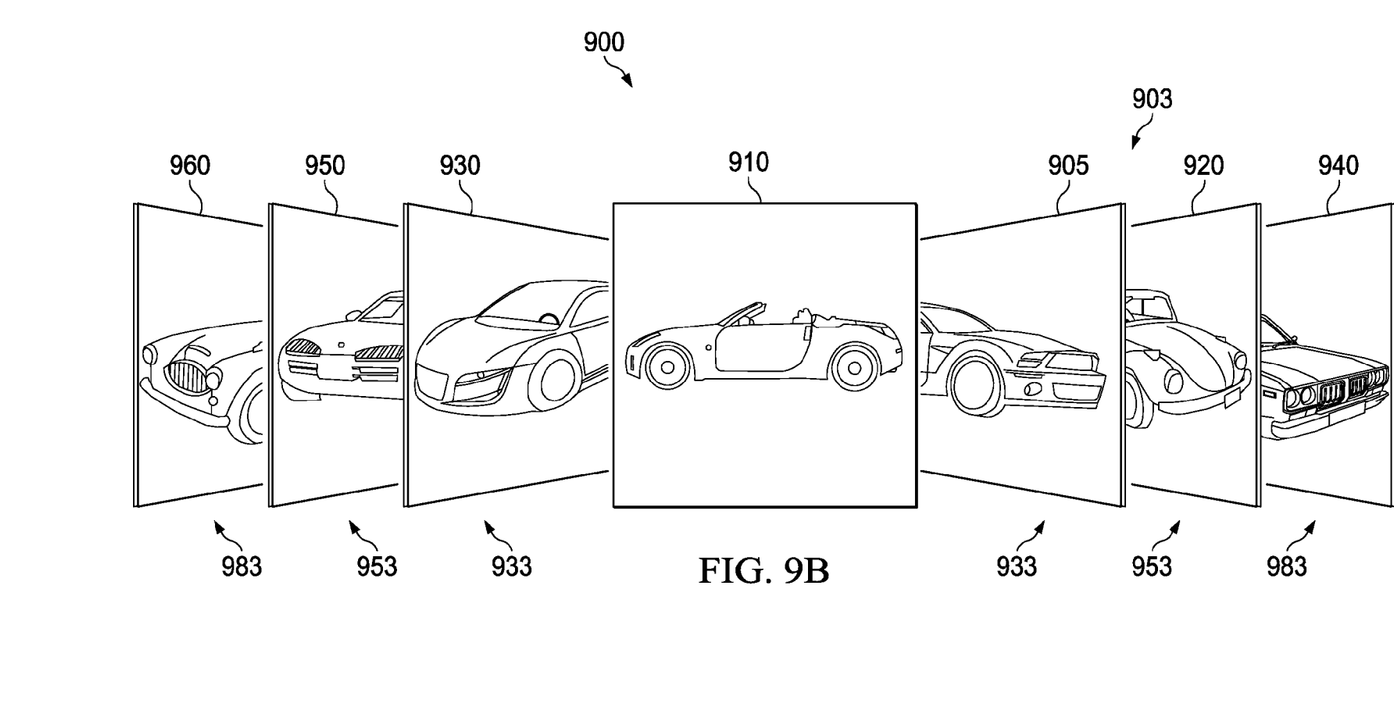
FIG. 9B is a diagram of an example embodiment of a system for varying frame rates of video thumbnails in a coverflow display.

In addition, the display of the video thumbnails may be changed in responding to a selection from the user. As shown in FIG. 9B, video thumbnail 910 is shifting to the centermost position while the user clicks video thumbnail 910. In detail, video thumbnail 910 is clicked by the user, video thumbnail 910 will be shifted to the position of video thumbnail 1905, and video thumbnail 905 will be shifted to the right. Because thumbnail 910 is regarded as the seminal video thumbnail, video thumbnail 910 will be set to the first frame rate, and the frame rates of the other thumbnails may be determined according to the embodiment provided in FIG. 9A.

Figure 10:
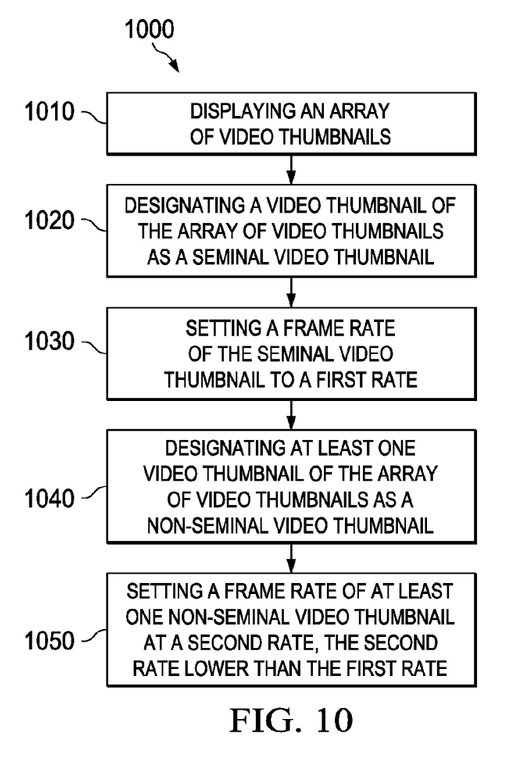
FIG. 10 is a flow diagram of an example embodiment of a method for varying frame rates of video thumbnails used in the system of claim 1.

FIG. 10 provides flow chart 1000 for an example embodiment of a method of variable frame rate playback. In block 1010, an array of video thumbnails is arranged on a display. In block 1020, a video thumbnail of the array of video thumbnails is designated as a seminal video thumbnail. The seminal video thumbnail may be designated according to parameters. As non-limiting examples, the parameters comprise the location of each video thumbnail, the visible area of each video thumbnail, the selection of video thumbnails according to user behavior and a combination of any or all of these parameters. The seminal video thumbnail may be a single video thumbnail, or, alternatively, it may comprise a plurality of video thumbnails. In block 1030, the frame rate of the seminal video thumbnail is set to a first rate. In block 1040, at least one video thumbnail of the array of video thumbnails is designated as a non-seminal video thumbnail. In block 1050, a frame rate of at least on non-seminal video thumbnail is set at a second rate, the second rate lower than the first rate. Each thumbnail of the array of thumbnails may play simultaneously. Alternatively, some of the video thumbnails may be paused or stopped while others continue to play.

Figure 11:
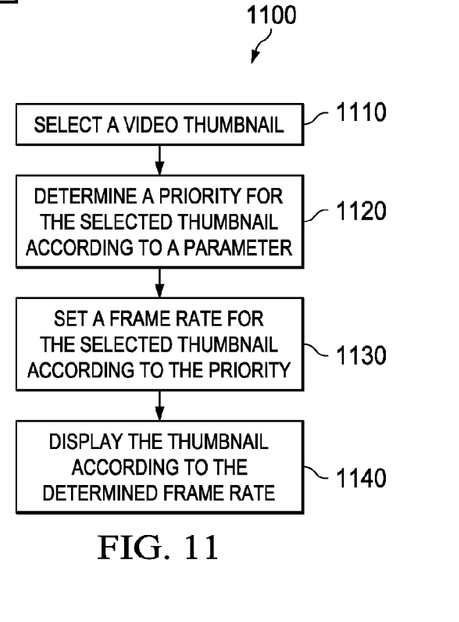
FIG. 11 is a flow diagram of an example embodiment of a method for varying frame rates of video thumbnails used in the system of claim 1.

FIG. 11 provides flow chart 1100 for an example embodiment of a method of variable frame rate playback. In block 1110, at least one thumbnail from a plurality of thumbnails is selected. In block 1120, a priority for the selected video thumbnails is determined according to a parameter. In block 1130, a frame rate for the selected video thumbnail is set according to the priority. In block 1140, the video thumbnail is displayed according to the determined frame rate. In such a method embodiment, the priority could be determined according to the visible area of the video frame, which is calculated from the size and the un-overlapped region. In one example embodiment, the seminal video thumbnail is set at a first rate. The average uncovered area of thumbnails in the second set of thumbnails is calculated to determine the ratio of uncovered area to area of the seminal video thumbnail. This ratio may be multiplied by the frame rate of the seminal video thumbnail to determine the frame rate of the second set of video thumbnails.

In an alternative example embodiment of a method of variable frame rate playback, video thumbnails are aligned in an array arrangement, and each video thumbnail's location in the array arrangement is recorded. The frame rate of each video that is located at an edge of the array arrangement is modified such that each video thumbnail is displayed at a different frame rate.

In another alternative example embodiment of a method of variable frame rate playback, video thumbnails are aligned in an array arrangement, a user's focus position is recorded, and the distance between each video thumbnail's location in the array arrangement and the user's focus position is recorded. The frame rate of each video that is located at an edge of the array arrangement is modified such that each video thumbnail is displayed at a different frame rate.

The flow chart of FIGS. 10 and 11 show the architecture, functionality, and operation of a possible implementation of the digital variable frame rate software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 10 and 11. For example, two blocks shown in succession in FIG. 10 may in fact be executed substantially concurrently or the blocks may sometimes be executed in the reverse order, depending upon the functionality involved.

Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Therefore, at least the following is claimed:

1. A method comprising:
displaying a set of video thumbnails, wherein each video thumbnail is derived from a different pre-recorded video clip;
designating at least one thumbnail of the set of thumbnails as a seminal video thumbnail;
setting a seminal video thumbnail frame rate at a first frame rate;
designating at least one video of the set of video thumbnails as a non-seminal video thumbnail; and
reducing a frame rate of the at least one non-seminal video thumbnail from the first frame rate to a second frame rate according to a distance of the at least one non-seminal video thumbnail from the seminal video thumbnail, the second frame rate being lower than the first frame rate.

2. The method of claim 1, wherein each thumbnail of the set of thumbnails plays simultaneously.

3. The method of claim 1, wherein the seminal video thumbnail is designated based on user behavior.

4. The method of claim 1, wherein the first frame rate is set according to a user preference.

5. The method of claim 1, wherein the seminal video thumbnail is designated by a pointer position.

6. The method of claim 1, wherein the seminal video thumbnail is designated according to a visible area of at least one of the video thumbnails.

7. The method of claim 1, wherein the set of video thumbnails is arranged in an array, the seminal video thumbnail has array coordinates of $X_c$ and $Y_c$, and at least one non-seminal video thumbnail, having array coordinates $X_s$ and $Y_s$, such that $\max(|X_s-X_c|, |Y_c-Y_s|)=1$, is designated as a secondary video thumbnail.

8. The method of claim 7, further comprising setting a frame rate of at least one tertiary video thumbnail at a third frame rate, the third frame rate lower than the second frame rate, wherein the tertiary thumbnails have array coordinates $X_t$ and $Y_t$, such that $\max(|X_t-X_c|, |Y_c-Y_t|)=2$.

9. The method of claim 1, wherein a subset of secondary video thumbnails are designated based on user behavior.

10. The method of claim 1, wherein a full size video is played in each video thumbnail of the array of video thumbnails.

11. The method of claim 1, wherein the seminal video thumbnail is the centermost video thumbnail of the set of video thumbnails.

12. The method of claim 1, wherein at least one video thumbnail of the set of video thumbnails is partially covered and the frame rate of the covered video thumbnail is less than the frame rate of the seminal video thumbnail.

13. The method of claim 12, wherein the ratio of the frame rate of the at least one partially covered video thumbnail to the frame rate of the seminal video thumbnail is substantially equal to the percentage of the at least one partially covered video thumbnail that is uncovered.

14. The method of claim 1, wherein
the set of video thumbnails is added to a display one at a time;
a latest added video thumbnail is designated as a seminal thumbnail; and
any thumbnail that is overlapped by the latest added video thumbnail is redesignated as a non-seminal video thumbnail.

15. A system comprising:
memory for storing software; and
a processor for executing the software, the software comprising instructions configured to:
display a set of video thumbnails, wherein each video thumbnail is derived from a different pre-recorded video clip;
designate at least one thumbnail of the set of thumbnails as a seminal video thumbnail;
set a seminal video thumbnail frame rate at a first frame rate;
designate at least one video of the set of video thumbnails as a non-seminal video thumbnail; and
reduce a frame rate of the at least one non-seminal video thumbnail from the first frame rate to a second frame rate according to a distance of the at least one non-seminal video thumbnail from the seminal video thumbnail, the second frame rate being lower than the first frame rate.

16. The system of claim 15, wherein the software further comprises instructions to play each thumbnail of the set of thumbnails simultaneously.

17. The system of claim 15, wherein the seminal video thumbnail is designated by user behavior.

18. The system of claim 15, wherein the first frame rate is set according to a user preference.

19. The system of claim 15, wherein the seminal video thumbnail is designated by a pointer position.

20. The system of claim 15, wherein the seminal video thumbnail is designated according to a visible area of at least one of the thumbnails.

21. The system of claim 15, wherein the set of video thumbnails is arranged in an array, the seminal video thumbnail has array coordinates of $X_c$ and $Y_c$, and at least one non-seminal video thumbnail, having array coordinates $X_s$ and $Y_s$, such that $\max(|X_s-X_c|, |Y_c-Y_s|)=1$, is designated as a secondary video thumbnail.

22. The system of claim 15, wherein at least one video thumbnail of the set of video thumbnails is partially covered and the frame rate of the covered video thumbnail is less than the frame rate of the seminal video thumbnail.

23. The system of claim 22, wherein the ratio of the frame rate of the at least one partially covered video thumbnail to the frame rate of the seminal video thumbnail is substantially equal to the percentage of the at least one partially covered video thumbnail that is uncovered.

24. The system of claim 15, wherein the software further comprises instructions configured to
add the set of video thumbnails to a display one at a time;
designate a latest added video thumbnail as a seminal thumbnail; and
redesignate any thumbnail that is overlapped by the latest added video thumbnail as a non-seminal video thumbnail.

25. A non-transitory computer readable medium comprising instructions for execution by a processor, the instructions comprising instructions for:
displaying a set of video thumbnails, wherein each video thumbnail is derived from a different pre-recorded video clip;
designating at least one thumbnail of the set of thumbnails as a seminal video thumbnail;
setting a seminal video thumbnail frame rate at a first frame rate;
designating at least one video of the set of video thumbnails as a non-seminal video thumbnail; and
reducing a frame rate of the at least one non-seminal video thumbnail from the first frame rate to a second frame rate according to a distance of the at least one non-seminal video thumbnail from the seminal video thumbnail, the second frame rate lower than the first frame rate.

26. The non-transitory computer readable medium of claim 25, wherein the instructions further comprise instructions for designating the seminal video thumbnail based on user behavior.

27. The non-transitory computer readable medium of claim 25, wherein the set of video thumbnails is arranged in an array, the seminal video thumbnail has array coordinates of $X_c$ and $Y_c$, and at least one non-seminal video thumbnail, having array coordinates $X_s$ and $Y_s$, such that $\max(|X_s-X_c|, |Y_c-Y_s|)=1$, is designated as a secondary video thumbnail.

28. The non-transitory computer readable medium of claim 25, wherein at least one video thumbnail of the set of video thumbnails is partially covered and the frame rate of the covered video thumbnail is less than the frame rate of the seminal video thumbnail.

29. The non-transitory computer readable medium of claim 28, wherein the ratio of the frame rate of the at least one partially covered video thumbnail to the frame rate of the seminal video thumbnail is substantially equal to the percentage of the at least one partially covered video thumbnail that is uncovered.

30. The non-transitory computer readable medium of claim 25, wherein the instructions further comprise instructions configured to
add the set of video thumbnails to a display one at a time;
designate a latest added video thumbnail as a seminal thumbnail; and
redesignate any thumbnail that is overlapped by the latest added video thumbnail as a non-seminal video thumbnail.

31. A method comprising:
displaying a set of video thumbnails, wherein at least a portion of the video thumbnails is displayed in an overlapping configuration such that at least one video thumbnail partially covers another video thumbnail, wherein the partially covered video thumbnail includes a visible area comprising the uncovered portion;
selecting at least one video thumbnail from a plurality of video thumbnails, wherein each video thumbnail is derived from a different pre-recorded video clip;
determining a priority for the at least one selected video thumbnails according to the visible area of the at least one selected video thumbnail;
setting a frame rate of the at least one selected video thumbnails according to the priority determined according to the visible area of the at least one selected video thumbnail; and
displaying the video thumbnails in a manner according to the determined frame rate.

32. The method of claim 31, wherein the frame rate of the partially covered video thumbnail is less than the determined frame rate.

33. The method of claim 32, wherein the ratio of the frame rate of the at least one partially covered video thumbnail to the determined frame rate is substantially equal to the percentage of the at least one partially covered video thumbnail that is uncovered.

34. The method of claim 31, wherein selecting the at least one video thumbnail is further performed according to a location of each of the video thumbnails, a pointer position, user behavior, or a combination thereof.

* * * * *